Figure 1:
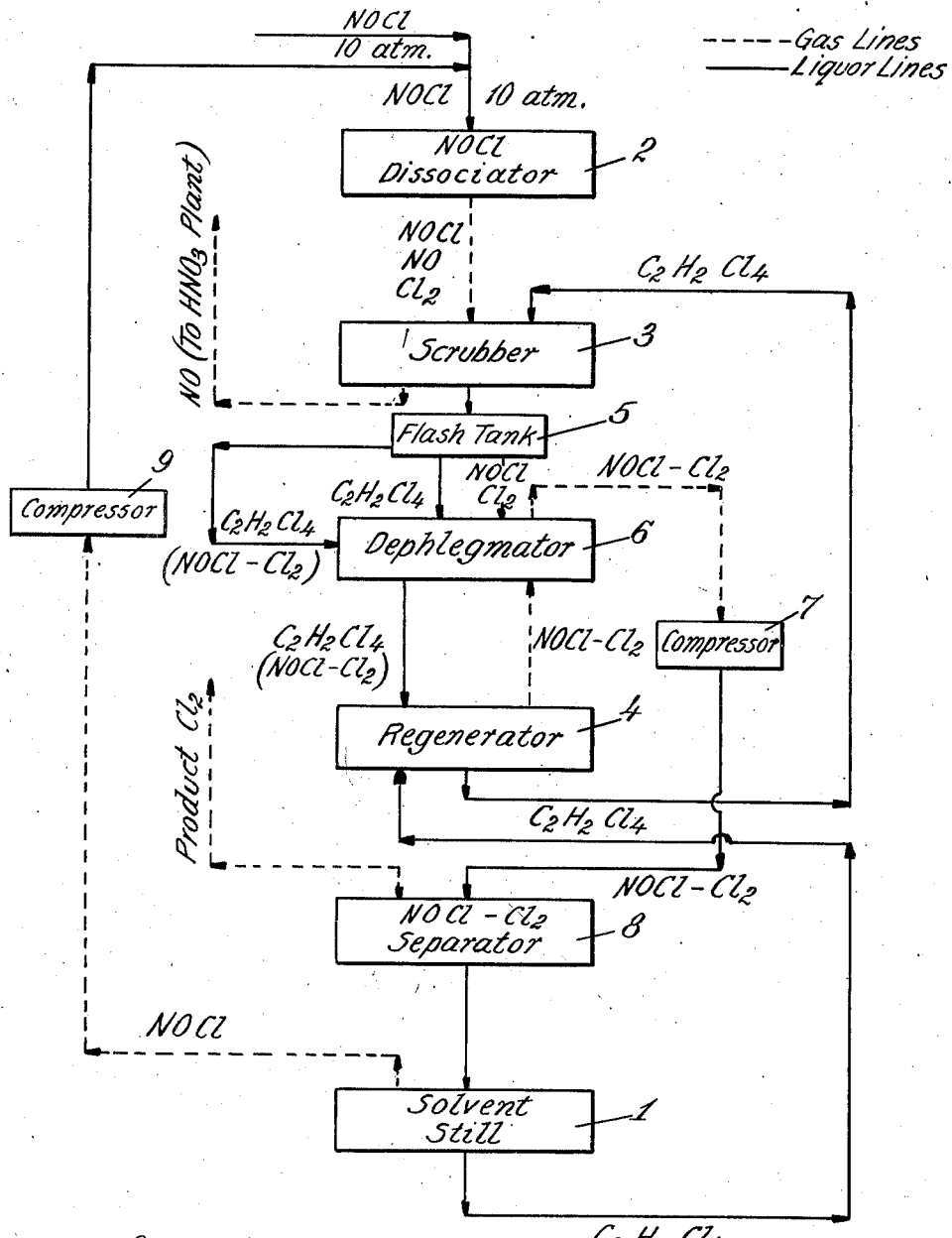

Patented Jan. 14, 1941

2,228,273

UNITED STATES PATENT OFFICE 2,228,273

PROCESS FOR OBTAINING ELEMENTAL CHLORINE FROM NITROSYL CHLORIDE-CONTAINING GASES

William C. Klingelhoefer, Syracuse, N. Y., assignor to The Solvay Process Company, New York, N. Y., a corporation of New York Application November 4, 1938, Serial No. 238,808

14 Claims. (Cl. 23—219)

This invention relates to the recovery of chlorine from nitrosyl chloride-containing gases. More particularly, this invention relates to the recovery of chlorine from nitrosyl chloride produced in the manufacture of alkali metal nitrates by the reaction of nitric acid with alkali metal chlorides.

In the process for producing alkali metal nitrates by the reaction of alkali metal chlorides with nitric acid, a gaseous mixture containing approximately equimolecular proportions of chlorine and nitrosyl chloride results; i. e., one-third of the chlorine in the reaction products is in combined form in the nitrosyl chloride. In many cases, it is highly desirable to recover the combined chlorine in nitrosyl chloride as elemental chlorine.

It is the object of this invention to provide a simple and economical method for the recovery of elemental chlorine from nitrosyl chloride.

Previous investigations have indicated that at temperatures below 100° C. the rate of decomposition of nitrosyl chloride into nitric oxide and chlorine is negligible compared to its rate of formation and that even at 25° C. the reaction between nitric oxide and chlorine to form nitrosyl chloride proceeds readily. However, I have made the discovery, which in view of these prior investigations is indeed surprising, that chlorine may be obtained from nitrosyl chloride by heating the nitrosyl chloride to cause it to dissociate into nitric oxide and chlorine, cooling the heated gases rapidly and contacting the cooled mixture with a chemically inert solvent capable of effecting separation of the chlorine from the nitric oxide.

In accordance with my invention chlorine is recovered from nitrosyl chloride as elemental chlorine by heating the nitrosyl chloride so as to cause it to dissociate into nitric oxide and chlorine and separating the chlorine from the nitric oxide by solvent extraction. The solvent used may be one in which either chlorine or nitric oxide is soluble; or the solvent may be one in which nitric oxide and nitrosyl chloride or chlorine and nitrosyl chloride are soluble. I have discovered that halogenated organic liquids, especially highly halogenated hydrocarbons such as carbon tetrachloride and tetrachlorethane are particularly suitable for use as the chemically inert solvents in accordance with the process of my invention, for they possess the property of selectively absorbing chlorine and nitrosyl chloride from a mixture of gases containing these constituents and nitric oxide, whereby separation of chlorine from the nitric oxide is effected. I have also found mixed halogenated organic liquids, especially liquid chloro-fluoro organic compounds such as chlorofluoroethanes also possess this property and hence are suitable for use as solvents in accordance with my invention. Furthermore, liquid nitrosyl chloride, liquid chlorine, or mixtures thereof, may be used as the solvent in accordance with this invention since such liquids also have the property of absorbing chlorine and nitrosyl chloride from a gaseous mixture of these compounds and nitric oxide. Other solvents which may be used in accordance with this invention are the chlorides and oxychlorides of sulfur, phosphorus, chromium, antimony, arsenic, silicon, and tin. The nitrosyl chloride may be heated in the presence of solvent vapors and the gaseous mixture cooled, whereby the nitrosyl chloride and chlorine are absorbed in the condensed solvent; I prefer, however, to conduct the dissociation and absorption separately. The nitrosyl chloride and chlorine absorbed in the solvents above mentioned may be recovered therefrom in any suitable manner and separated to recover a substantially pure chlorine product and nitrosyl chloride for reuse.

The nitrosyl chloride which is to be treated in accordance with the process of my invention may be substantially pure nitrosyl chloride such as is obtained by the rectification of nitrosyl chloride-chlorine mixtures obtained from the reaction of alkali metal chlorides with nitric acid; or such gaseous mixtures of nitrosyl chloride and chlorine may be treated in accordance with the process of my invention without rectification of the mixture. The process of my invention will differ slightly depending upon whether substantially pure nitrosyl chloride or nitrosyl chloride-chlorine mixtures are to be treated, for if the latter is the case it is advantageous to separate the chlorine from the nitrosyl chloride prior to heating the nitrosyl chloride to cause it to dissociate. This separation may be effected in any suitable manner. I have found that when using one of the above-mentioned solvents in accordance with my invention, it is preferable to first absorb both the nitrosyl chloride and chlorine of the mixture to be treated in the solvent to be used to separate these gases from any inert gases present in the mixture, recover the absorbed gases from the solvent, separate the recovered gases by rectification, and then treat the nitrosyl chloride thus obtained in accordance with this invention. However, the chlorine may be separated from the nitrosyl chloride by fractionation if desired.

Considering first the process of my invention as applied to the treatment of substantially pure nitrosyl chloride to recover elemental chlorine therefrom, the nitrosyl chloride, which may be obtained by the reaction of an alkali metal chloride with nitric acid and which may be separated from the chlorine produced therewith in any suitable manner such as by rectification, is passed at a space velocity between about 100 and about several thousand, preferably between about 100 and about 200, through a vessel heated to a temperature between about 200° and about 500° C., preferably between about 400° and about 500° C. and maintained at a pressure between about one and about 20 atmospheres, preferably at about 10 atmospheres. The nitrosyl chloride thereby is caused to dissociate to a substantial extent to form a chlorine-nitric oxide-nitrosyl chloride mixture. This mixture is then preferably passed directly to a cooler, cooled as rapidly as feasible to about 30° C., and scrubbed with tetrachlorethane in an amount sufficient to absorb the chlorine and nitrosyl chloride contained in the mixture. However, the hot dissociated mixture may be led directly to the absorber containing the tetrachlorethane and cooled and scrubbed therein, the cooling being effected by external means. I have found about 129 pound mols of tetrachlorethane per 100 pound mols of nitrosyl chloride admitted to the cracking vessel are suitable. The absorption is advantageously carried out in a packed column provided with a water cooling system to remove any heat evolved during absorption. Preferably the absorption is carried out under pressure, e. g., 10 atmospheres, and at a temperature of about 30° C. or lower in order to obtain efficient absorption of the chlorine and introsyl chloride; however, any pressure or temperature suitable for carrying out the process of my invention may be used. The lower portion of the column is maintained at a temperature sufficient to drive off any nitric oxide which may be dissolved in the tetrachlorethane; thus, for example, when operating under a pressure of 10 atmospheres, a temperature of 100° C. in the lower part of the scrubber is sufficient to remove any nitric oxide dissolved in the solvent. Operating in this manner substantially all the nitrosyl chloride and chlorine are absorbed in the tetrachlorethane; the nitric oxide which passes through the column substantially unabsorbed may be mixed with air and absorbed in water to form strong nitric acid, or treated in any other suitable manner.

The solution leaving the scrubber is then treated to regenerate the tetrachlorethane solvent and to produce a chlorine-nitrosyl chloride gaseous mixture. If the scrubbing is carried out at atmospheric pressure this regeneration may be effected by heating the solvent removed from the scrubber to a suitable temperature. However, since I prefer to operate the scrubber at elevated pressures, the bulk of the dissolved gases may be liberated from the tetrachlorethane by permitting the pressure on the solvent to be let down to about one atmosphere. The chlorine and nitrosyl chloride remaining in the solvent after the pressure has been released may be recovered by heating the solution in a suitable manner to cause the dissolved gases to be discharged, leaving substantially pure solvent which may be reused in the practice of this invention. The mixture of nitrosyl chloride and chlorine recovered from the solvent is then separated in any suitable manner, e. g., by rectification under pressure, in order to recover elemental chlorine in a substantially pure condition and to obtain the nitrosyl chloride for reuse.

As indicated above, this invention is also applicable to the treatment of nitrosyl chloride-chlorine mixtures. The chlorine preferably is separated from the nitrosyl chloride prior to treatment of the latter. This separation may be effected by rectification of the mixture under pressure. Preferably it is accomplished by absorbing the nitrosyl chloride and chlorine in tetrachlorethane or carbon tetrachloride and then recovering the gases from the solvent in any suitable manner and separating the chlorine and nitrosyl chloride by a pressure rectification, as in this way any inert gases are removed from the nitrosyl chloride-chlorine mixture to be treated. After the nitrosyl chloride is separated from the chlorine, the process for the recovery of chlorine therefrom is similar to that described above for the treatment of substantially pure nitrosyl chloride.

It is to be understood other highly halogenated organic liquids may be used in place of carbon tetrachloride and tetrachlorethane in the processes described above; mixed halogenated organic liquids such as chlorofluoroethanes may also be used. Furthermore, liquid nitrosyl chloride, liquid chlorine, or mixtures thereof, may be employed as solvents in the above process; when using highly volatile solvents of this type the vaporized solvent leaving the absorber with the unabsorbed nitric oxide is recovered by liquefaction or absorption and returned to the absorber, or the absorber is operated at a temperature low enough to prevent escape of substantial amounts of solvent therefrom.

In the accompanying drawings forming a part of this specification and showing for purposes of exemplification preferred manners of carrying out this invention, Fig. 1 represents a preferred manner of carrying out the process of my invention as applied to the treatment of substantially pure nitrosyl chloride to recover free chlorine therefrom as described above; and Fig. 2 shows for the purposes of illustration a preferred manner of carrying out the recovery of chlorine from nitrosyl chloride-chlorine mixtures in accordance with my invention.

In Fig. 1 substantially pure nitrosyl chloride from any source together with that recovered from solvent still 1 is passed at a pressure of about 10 atmospheres into the NOCl dissociator 2, wherein the nitrosyl chloride is heated to a temperature of about 400° C. The mixture of nitrosyl chloride, nitric oxide, and chlorine thus produced is then, after cooling to about 30° C., passed to scrubber 3 wherein it is scrubbed at about 10 atmospheres pressure and about 30° C. with about 129 pound mols of tetrachlorethane per 100 pound mols of nitrosyl chloride admitted to dissociator 2. The nitric oxide gas, which is not absorbed in the tetrachlorethane, is withdrawn from scrubber 3 and utilized as desired; for example, in the manufacture of nitric acid.

The tetrachlorethane containing the absorbed nitrosyl chloride and chlorine is then passed to flash tank 5 wherein the pressure on the tetrachlorethane is released, the bulk of the nitrosyl chloride and chlorine vaporizing and passing to the top of dephlegmator 6. The major portion of the tetrachlorethane, which still contains a substantial amount of nitrosyl chloride and chlorine, is then introduced into the mid-point of dephlegmator 6. Dephlegmator 6 and regenerator 4, which are shown in the drawings for purposes of convenience as separate units, are actually parts of one column. In regenerator 4 the tetrachlorethane is heated to about 150° C., whereby any dissolved nitrosyl chloride and chlorine are driven off and rise to dephlegmator 6; the tetrachlorethane residue is returned to scrubber 3. In dephlegmator 6 the hot gases evolved in regenerator 4 contact the solution from flash tank 5 introduced into the mid-point of dephlegmator 6 as described, thus heating the solution and vaporizing the dissolved nitrosyl chloride and chlorine. To prevent loss of tetrachlorethane, that part of the tetrachlorethane solution from flash tank 5 which is not introduced at the mid-point of dephlegmator 6 is cooled to about 30° C. and introduced at the top of dephlegmator 6, whereby the withdrawal of substantial amounts of tetrachlorethane vapors along with the nitrosyl chloride-chlorine mixture is prevented. The nitrosyl chloride-chlorine gas discharged in flash tank 5 is mixed in the top of dephlegmator 6 with the gases evolved therein and withdrawn therefrom. This mixture is then passed to compressor 7 wherein it is compressed to about 10 atmospheres pressure to liquefy the gaseous mixture. The liquid is then introduced into NOCl—Cl₂ separator 8 where it is rectified to recover pure chlorine. The liquid nitrosyl chloride residue from separator 8 is withdrawn to solvent still 1, whereby it is heated to from about 100° to about 150° C. to separate the bulk of the nitrosyl chloride from the tetrachlorethane still remaining therein, the tetrachlorethane containing the remaining traces of nitrosyl chloride being returned to regenerator 4. The nitrosyl chloride recovered from solvent still 1 is compressed to about 10 atmospheres pressure in compressor 9 and returned to NOCl dissociator 2.

It is to be understood that while in the above discussion tetrachlorethane has been referred to as the preferred solvent used, other solvents such as carbon tetrachloride capable of dissolving nitrosyl chloride and chlorine may be used in the same manner with equal success. When using carbon tetrachloride, it is preferable to omit flash tank 5 and carry out the regeneration of the solvent and recovery of the absorbed gases under pressure. Furthermore, nitrosyl chloride-chlorine mixtures could be treated by simply introducing the mixture to compressor 7 and rectifying it in separator 8 to recover nitrosyl chloride.

Figure 2:
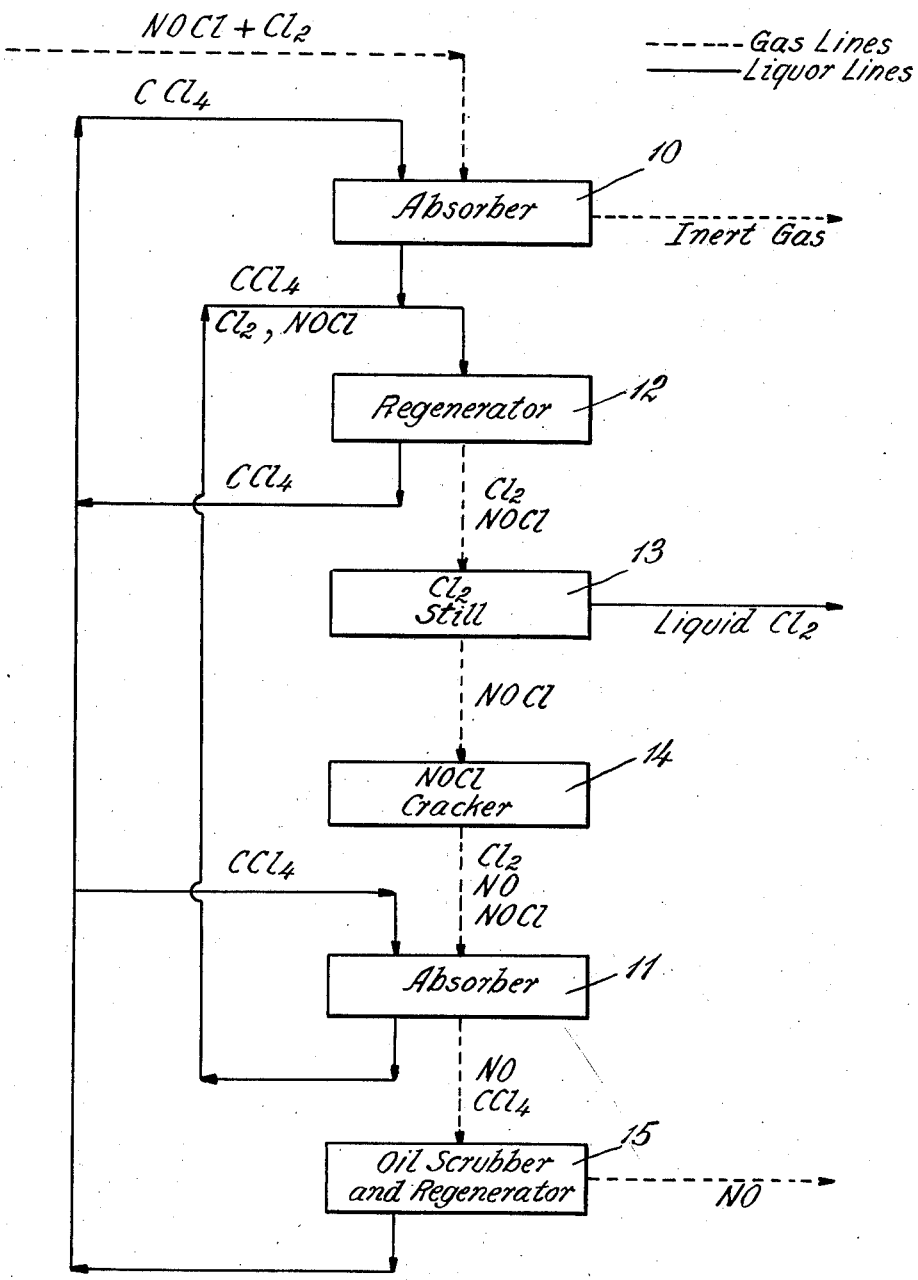

Referring to Fig. 2, a nitrosyl chloride-chlorine mixture is introduced into absorber 10 wherein the mixture is contacted at one atmosphere pressure with a countercurrent flow of carbon tetrachloride at a temperature of about 30° C.. The nitrosyl chloride and chlorine are absorbed in the carbon tetrachloride and any inert gas is discharged from absorber 10; any carbon tetrachloride which vaporizes into the inert gas may be recovered by absorbing the carbon tetrachloride in an oil scrubber. The solution of nitrosyl chloride and chlorine in carbon tetrachloride is withdrawn from absorber 10, mixed with a similar solution recovered from absorber 11, described below, and introduced into regenerator 12. In regenerator 12 the nitrosyl chloride and chlorine are distilled from the carbon tetrachloride solution by heating the solution to about 190° C. at a pressure of about 10 atmospheres, the carbon tetrachloride thus recovered being returned to absorber 10. The chlorine-nitrosyl chloride mixture withdrawn from regenerator 12 is introduced into Cl₂ still 13 operated at about 10 atmospheres pressure, wherein the chlorine and nitrosyl chloride are separated by fractionation, substantially pure liquid chlorine being withdrawn. The nitrosyl chloride separated in this manner from the chlorine then passes through NOCl cracker 14 at a space velocity of about 200, the cracker being at a temperature of about 400° C. and a pressure of about 10 atmospheres. The gaseous mixture withdrawn from cracker unit 14, which consists of nitric oxide, nitrosyl chloride, and chlorine, is cooled as rapidly as feasible to about 30° C., and introduced into absorber 11 wherein it is contacted countercurrently with a flow of carbon tetrachloride at a temperature of about 30° C. and a pressure of about 10 atmospheres. The nitrosyl chloride and chlorine are absorbed in the carbon tetrachloride and the solution thus formed is withdrawn from absorber 11, mixed with the solution from absorber 10, and regenerated in regenerator 12, as described above. The nitric oxide which is not absorbed in the carbon tetrachloride passes from absorber 11, carrying with it a small amount of carbon tetrachloride vapors. These vapors are scrubbed with oil in oil scrubber 15 and the carbon tetrachloride subsequently recovered in any suitable manner from the oil, such as, for example, by stripping the oil with steam. The carbon tetrachloride thus recovered may be reused in absorbers 10 and 11. The nitric oxide may be used as desired.

While the above description refers to the use of carbon tetrachloride as the solvent, it is understood that solvents such as tetrachlorethane may be used in the same manner to obtain substantially the same results.

It will be seen from the above description that in accordance with my invention chlorine may be recovered from nitrosyl chloride-containing gases in a simple and economical manner. This process is therefore of considerable value in the manufacture of alkali metal nitrates by the reaction of alkali metal chlorides and nitric acid for, by operating in accordance with my invention, practically all the chlorine which is converted to nitrosyl chloride in the manufacture of alkali metal nitrates may be recovered as elemental chlorine and sold as such.

I claim:

1. In a process of recovering elemental chlorine from nitrosyl chloride-containing gases, the steps which comprise heating the nitrosyl chloride to cause it to dissociate into nitric oxide and chlorine, contacting the gaseous mixture thus obtained with a solvent which is chemically inert with respect to nitric oxide and chlorine and in which one of the products of the nitrosyl chloride dissociation is substantially more soluble than the other product, to separate chlorine from nitric oxide, and recovering elemental chlorine.

2. In a process of recovering elemental chlorine from nitrosyl chloride-containing gases, the steps which comprise heating the nitrosyl chloride to cause it to dissociate into nitric oxide and chlorine, contacting the gaseous mixture thus obtained with an organic liquid selected from the group consisting of halogenated and mixed halogenated organic liquid solvents to absorb the chlorine and nitrosyl chloride contained in the mixture, recovering nitrosyl chloride and chlorine from the organic liquid, and separating substantially pure chlorine from the mixture of nitrosyl chloride and chlorine thus recovered.

3. In a process of recovering elemental chlorine from nitrosyl chloride-containing gases, the steps which comprise heating the nitrosyl chloride to cause it to dissociate into nitric oxide and chlorine, contacting the gaseous mixture thus obtained with a highly halogenated hydrocarbon solvent in liquid form to absorb the nitrosyl chloride and chlorine contained in the mixture, recovering nitrosyl chloride and chlorine from the halogenated hydrocarbon solvent, and separating substantially pure chlorine from the mixture of nitrosyl chloride and chlorine thus recovered.

4. In a process of recovering elemental chlorine from nitrosyl chloride-containing gases, the steps which comprise heating the nitrosyl chloride to cause it to dissociate into nitric oxide and chlorine, contacting the gaseous mixture thus obtained with tetrachlorethane to absorb the chlorine and nitrosyl chloride contained in the mixture, recovering nitrosyl chloride and chlorine from the tetrachlorethane, and separating substantially pure chlorine from the mixture of nitrosyl chloride and chlorine thus recovered.

5. In a process of recovering elemental chlorine from nitrosyl chloride-containing gases, the steps which comprise heating the nitrosyl chloride to cause it to dissociate into nitric oxide and chlorine, contacting the gaseous mixture thus obtained with carbon tetrachloride to absorb the chlorine and nitrosyl chloride contained in the mixture, recovering nitrosyl chloride and chlorine from the carbon tetrachloride, and separating substantially pure chlorine from the mixture of nitrosyl chloride and chlorine thus recovered.

6. In a process of recovering elemental chlorine from nitrosyl chloride-containing gases, the steps which comprise heating the nitrosyl chloride to cause it to dissociate into nitric oxide and chlorine, contacting the gaseous mixture thus obtained with a liquid selected from the group consisting of liquid nitrosyl chloride, liquid chlorine, and mixtures thereof, to absorb the nitrosyl chloride and chlorine contained in the mixture, recovering nitrosyl chloride and chlorine from the liquid solvent, and separating substantially pure chlorine from the mixture of nitrosyl chloride and chlorine thus recovered.

7. In a process of recovering elemental chlorine from a mixture of chlorine and nitrosyl chloride, the steps which comprise separating the chlorine from the nitrosyl chloride, heating the nitrosyl chloride to cause it to dissociate into nitric oxide and chlorine, contacting the gaseous mixture thus obtained with a solvent which is chemically inert with respect to nitric oxide and chlorine and in which one of the products of the nitrosyl chloride dissociation is substantially more soluble than the other product, to separate chlorine from nitric oxide, and recovering elemental chlorine.

8. In a process for the recovery of elemental chlorine from nitrosyl chloride-containing gases, the steps which comprise heating the nitrosyl chloride under pressure to a temperature between about 200° and about 500° C. to cause it to dissociate into nitric oxide and chlorine, rapidly cooling the gaseous mixture thus obtained, contacting the cooled mixture under pressure with tetrachlorethane to absorb nitrosyl chloride and chlorine, separating nitric oxide from the tetrachlorethane solution, recovering nitrosyl chloride and chlorine from the tetrachlorethane, and separating elemental chlorine from nitrosyl chloride.

9. In a process for the recovery of elemental chlorine from nitrosyl chloride-containing gases, the steps which comprise heating the nitrosyl chloride under pressure to a temperature between about 200° and about 500° C. to cause it to dissociate into nitric oxide and chlorine, rapidly cooling the gaseous mixture thus obtained, contacting the cooled mixture under pressure with carbon tetrachloride to absorb nitrosyl chloride and chlorine, separating nitric oxide from the carbon tetrachloride solution, recovering nitrosyl chloride and chlorine from the carbon tetrachloride, and separating elemental chlorine from nitrosyl chloride.

10. In the recovery of elemental chlorine from nitrosyl chloride-containing gases, the steps which comprise heating the nitrosyl chloride to a temperature of about 400° C. at a pressure of about 10 atmospheres to cause it to dissociate into nitric oxide and chlorine, rapidly cooling the gaseous mixture thus obtained to about 30° C., scrubbing the cooled mixture with tetrachlorethane at a pressure of about 10 atmospheres to absorb nitrosyl chloride and chlorine, releasing the pressure on the tetrachlorethane so as to cause the bulk of the absorbed nitrosyl chloride and chlorine to flash into vapor, recovering the remainder of the nitrosyl chloride and chlorine from the tetrachlorethane by heating the tetrachlorethane to approximately its boiling temperature, mixing the nitrosyl chloride and chlorine thus recovered with that obtained by releasing the pressure on the tetrachlorethane, compressing the mixture to about 10 atmospheres to liquefy the mixture, fractionating the compressed liquid mixture to recover elemental chlorine therefrom, separating residual tetrachlorethane from the nitrosyl chloride obtained by fractionation, and utilizing this nitrosyl chloride to produce additional quantities of elemental chlorine.

11. In the recovery of elemental chlorine from mixtures of nitrosyl chloride and chlorine, the steps which comprise absorbing the nitrosyl chloride and chlorine in carbon tetrachloride at a pressure of about one atmosphere, separating unabsorbed gases from the carbon tetrachloride solution, recovering a nitrosyl chloride-chlorine mixture from the carbon tetrachloride solution by heating the same at a pressure of about 10 atmospheres, fractionally distilling the nitrosyl chloride-chlorine mixture thus recovered at a pressure of about 10 atmospheres to recover elemental chlorine therefrom, vaporizing the nitrosyl chloride thus obtained, heating the vapors to a temperature of about 400° C. at a pressure of about 10 atmospheres to cause the nitrosyl chloride to dissociate into nitric oxide and chlorine, contacting the gaseous mixture thus obtained with carbon tetrachloride at a pressure of about 10 atmospheres, separating nitric oxide from the carbon tetrachloride solution, recovering nitrosyl chloride and chlorine from the carbon tetrachloride solution by heating the same at a pressure of about 10 atmospheres, and recovering elemental chlorine from the mixture of nitrosyl chloride and chlorine thus recovered.

12. The process of recovering chlorine from nitrosyl chloride-containing gases which comprises heating the nitrosyl chloride to cause it to dissociate into nitric oxide and chlorine, rapidly cooling the gaseous mixture and separating the chlorine from the nitric oxide by contacting the dissociated gas mixture with a solvent which is chemically inert with respect to nitric oxide and chlorine and in which one of the products of the nitrosyl chloride dissociation is substantially more soluble than the other product.

13. In a process of recovering elemental chlorine from nitrosyl chloride-containing gases, the steps which comprise heating the nitrosyl chloride to cause it to dissociate into nitric oxide and chlorine, rapidly cooling the reaction product, contacting the gaseous mixture thus obtained with an organic liquid selected from the group consisting of halogenated and mixed halogenated organic liquid solvents to dissolve the chlorine and nitrosyl chloride contained in the mixture, recovering nitrosyl chloride and chlorine from the organic liquid, and separating substantially pure chlorine from the mixture of nitrosyl chloride and chlorine thus recovered.

14. In a process of recovering elemental chlorine from nitrosyl chloride-containing gases, the steps which comprise heating the nitrosyl chloride to cause it to dissociate into nitric oxide and chlorine, contacting the gaseous mixture thus obtained with a solvent which is chemically inert with respect to nitric oxide and chlorine and in which chlorine is substantially more soluble than nitric oxide, to separate chlorine from nitric oxide, and recovering elemental chlorine.

WILLIAM C. KLINGELHOEFER.